United States Patent
Jung et al.

(10) Patent No.: US 8,140,133 B2
(45) Date of Patent: Mar. 20, 2012

(54) SLIM PORTABLE TERMINAL

(75) Inventors: Young-Jun Jung, Daegu (KR);
Sung-Sun Park, Gumi-si (KR);
Gyu-Bok Lee, Daegu (KR);
Byeong-Kuk Lee, Daegu (KR);
Hyon-Myong Song, Daegu (KR);
Seog-Geun Lee, Gumi-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1602 days.

(21) Appl. No.: 11/451,544

(22) Filed: Jun. 13, 2006

(65) Prior Publication Data

US 2007/0026909 A1 Feb. 1, 2007

(30) Foreign Application Priority Data

Jul. 29, 2005 (KR) .................. 10-2005-0069882
Mar. 17, 2006 (KR) .................. 10-2006-0024821

(51) Int. Cl.
*H04M 1/00* (2006.01)
(52) U.S. Cl. ............... 455/575.3; 455/566; 455/575.1
(58) Field of Classification Search .......... 455/41.1, 455/169.1, 299, 333, 566, 575.1–575.8
See application file for complete search history.

(56) References Cited

U.S. PATENT DOCUMENTS

| | | | | |
|---|---|---|---|---|
| 5,265,265 A * | 11/1993 | Hama et al. | .................. | 455/300 |
| 6,785,562 B2 * | 8/2004 | Lee et al. | .................. | 455/566 |
| 6,892,082 B2 * | 5/2005 | Boesen | .................. | 455/575.3 |
| 7,155,253 B2 * | 12/2006 | Sawayama et al. | .................. | 455/556.1 |
| 7,400,902 B2 * | 7/2008 | Jeon | .................. | 455/550.1 |
| 7,499,074 B2 * | 3/2009 | Kim et al. | .................. | 348/14.02 |
| 2002/0022459 A1 * | 2/2002 | Kobayashi | .................. | 455/90 |
| 2003/0078077 A1 * | 4/2003 | Kokubo | .................. | 455/566 |
| 2004/0198476 A1 * | 10/2004 | Aikawa et al. | .................. | 455/575.3 |
| 2005/0007358 A1 | 1/2005 | Lee | | |
| 2005/0151830 A1 * | 7/2005 | Yamazaki | .................. | 347/238 |
| 2005/0215296 A1 * | 9/2005 | Fujihara et al. | .................. | 455/575.3 |
| 2005/0282595 A1 * | 12/2005 | Spence et al. | .................. | 455/575.3 |

FOREIGN PATENT DOCUMENTS

| | | |
|---|---|---|
| CN | 1293508 | 5/2001 |
| CN | 1469614 | 1/2004 |
| EP | 1 379 056 A | 1/2004 |
| EP | 1 404 088 A | 3/2004 |
| EP | 1 406 426 | 4/2004 |
| JP | 2001-308992 | 11/2001 |
| KR | 20-0376791 Y1 | 2/2005 |

* cited by examiner

*Primary Examiner* — Tuan H Nguyen (74) *Attorney, Agent, or Firm* — Roylance, Abrams, Berdo & Goodman, L.L.P.

(57) ABSTRACT

An ultra-slim portable terminal is disclosed. The ultra-slim portable terminal includes a body having a first portion and a second portion. An auxiliary display unit which is always exposed to the outside is provided on the upper surface of the first portion of the body, and the second portion of the body is recessed from the first portion of the body by a certain depth. A folder including a main display unit is connected to the body by a hinge to open and close the second portion. When the folder is folded onto the second portion, it is substantially parallel to the first portion.

23 Claims, 6 Drawing Sheets

SLIM PORTABLE TERMINAL

PRIORITY

This application claims the benefit under 35 U.S.C. §119 (a) of an application filed with the Korean Intellectual Property Office on Jul. 29, 2005 and assigned Serial No. 2005-69882, and an application filed with the Korean Intellectual Property Office on Mar. 17, 2006 and assigned Serial No. 2006-24821, the entire contents of both of which are hereby incorporated by reference.

BACKGROUND OF THE INVENTION

1. Field of the Invention

The present invention relates to a portable terminal, such as a DMB phone, a game phone, a chatting phone, a camera phone, an MP3 phone, a cellular phone, a PCS, a Personal Digital Assistant (PDA), a Hand Held Phone (HHP), and the like. More particularly, the present invention relates to an ultra-slim portable terminal.

2. Description of the Related Art

In general, a "portable terminal" is an electronic device which a user may carry to communicate with another user wirelessly. To improve portability, the design of portable terminals has tended toward more compact, slim and light devices. Furthermore, in keeping with recent trends, portable terminals are being provided with multimedia capabilities to allow users to pursue a wider variety of functions. In particular, recent portable terminals are multi-functional while still being compact and light, and are suitable for functioning in multimedia environments and for providing internet access and functions. Such portable terminals may be used by men and women, young and old, anywhere in the world, and many users consider portable terminals a necessity which must always be carried.

Conventional portable terminals may be classified into various types of devices based on their appearance, such as bar-type portable terminals, flip-type portable terminals, or folder-type portable terminals. A bar-type portable terminal has a single housing which is shaped like a bar. A flip-type portable terminal has a flip panel which is pivotally mounted to a bar-shaped housing by a hinge unit. A folder-type portable terminal has a folder coupled to a single bar-shaped housing by a hinge unit in such a manner that the folder can be rotated to be folded or unfolded from the housing. Portable terminals may also be classified as neck wearable-type terminals or wrist wearable-type terminals, according to the position at or the way in which a user wears the terminal. The neck wearable-type portable terminal is one which a user wears around the neck using a lanyard or necklace, while the wrist wearable-type portable terminal is one which a user wears around the wrist. Additionally, portable terminals may be classified as rotation-type terminals and sliding-type terminals according to the method of opening and closing the terminals. In a rotation-type portable terminal, two housings are coupled to each other to face each other, and one housing rotates to be opened or closed relative to the other. In a sliding-type portable terminal, two housings are coupled to each other in a manner that one housing slides relative to the other housing to open or close the portable terminal. These various classifications of portable terminals are easily understood by those skilled in the art.

Further, recent conventional portable terminals allow voice communication as well as high-speed data communication. That is, as consumer demands have increased, various services have been provided using wireless communication technology for transmitting and receiving data at a high speed.

Currently, portable terminals may be provided with an external or embedded camera lens module, and it is possible to transmit image signals and the like. Therefore, it is possible to perform image communication or to photograph a desired subject.

Conventional folder-type portable terminals have certain disadvantages, however.

A conventional folder-type portable terminal includes a body and a folder which is folded to the body by a hinge. Two display units, such as a main display unit and an auxiliary display unit, are stacked in such a manner that the main display unit is disposed on one surface of the folder and the auxiliary display unit is disposed on the other surface of the folder. This makes it difficult to make the folder slim, and makes it difficult to reduce the overall thickness of the portable terminal.

In a typical conventional folder-type portable terminal, the auxiliary display unit generally is mounted to the outer surface of the folder and the main display unit is mounted to the inner surface of the folder. The auxiliary display unit mounted on the outer surface of the folder displays data which a user frequently consults, for example, time information, date information, data regarding antenna reception intensity, data indicating the remaining lifespan of a battery, data indicating that a message is received, and the like. This allows a user to conveniently view this data without opening the folder.

Further, since the body of the conventional folder-type portable terminal includes a keypad having a plurality of keys, a main printed circuit board, and a battery pack, which are stacked with respect to one another, it is difficult to make the body slim. The mounting space required by an antenna unit provided at the upper end of the body, in which a whip antenna is inserted into and withdrawn from the antenna unit, also makes it difficult to make the terminal slim. Therefore, in a conventional folder-type portable terminal, since it is difficult to make the body and the folder slim, the overall thickness of the portable terminal is thick. The thickness may make it difficult to grasp the portable terminal, and some users may find the appearance unattractive.

Further, in a conventional folder-type portable terminal, since signals are generated by pressing keys of the keypad, a certain space is required to allow the keys to be pressed. Therefore, the thickness of the keypad must be more than a certain thickness, thereby producing another obstacle to making the body of the portable terminal slim.

Moreover, a conventional folder type portable terminal has no method for holding the folder in a stable position when the folder is closed onto the body, which may cause a hinge to crack. Specifically, to make the folder slim, it is necessary to stably hold the folder closed and reduce the opening and closing forces transferred to the hinge. Thus, when the folder is closed, it makes little movement, and a minimal force is applied to the hinge, thereby preventing the hinge from cracking.

Accordingly, there is a need for an improved portable terminal which is ultra-slim so that it is easy to carry and reliable.

SUMMARY OF THE INVENTION

An object of the present invention is to address at least the above problems and/or disadvantages and to provide at least the advantages described below. Accordingly, an object of the present invention is to provide a portable terminal which is ultra-slim and thus is convenient to carry.

It is another object of the present invention to provide a portable terminal in which a main display unit is installed on the folder side and an auxiliary display unit is installed on the body side so that it is always exposed, thereby minimizing the thicknesses of the body and the folder and contributing to the slimness of the portable terminal.

It is still another object of the present invention to provide a portable terminal in which the body is divided into two areas which are stepped, an auxiliary display unit is provided in a protruding portion, and an information input/output device is provided in a recessed portion, thereby contributing to the slimness of the body.

It is yet another object of the present invention to provide a portable terminal in which the body is divided into two areas, an auxiliary display unit and a transmitter are provided in a protruding portion so as to be substantially parallel to each other and an antenna apparatus is disposed so as to be stacked with the auxiliary display unit and the transmitter, thereby contributing to the slimness of the body.

It is another object of the present invention to provide a portable terminal in which the body is divided into two areas and an antenna apparatus and a battery pack are disposed in a protruding portion so as to be substantially parallel to each other, thereby contributing to the slimness of the body.

It still another object of the present invention to provide a portable terminal in which a shield can is provided between an information input/output device provided in the body and a battery inner cell, thereby contributing to the slimness of the body.

It is yet another object of the present invention to provide a portable terminal in which a main display unit and an auxiliary display unit are disposed substantially parallel to each other when the portable terminal is folded, thereby contributing to the slimness of the body.

It is another object of the present invention to provide a portable terminal in which a main display unit and an auxiliary display unit are disposed substantially parallel to each other on the folder, thereby making the folder slim.

It is still another object of the present invention to provide a portable terminal which includes means for stably supporting a closed folder so that the folder is stable when it is opened and closed and so that the folder is structurally protected when it is closed.

It is yet another object of the present invention to provide a portable terminal which can protect the folder from impact forces when the terminal is dropped and the folder is closed.

It is another object of the present invention to provide a portable terminal which minimize the movement of the closed folder and protect the slim sized folder, thereby applying minimum force to the hinge.

In accordance with an exemplary embodiment of the present invention, there is provided an ultra slim type portable terminal including a body and a folder. The body includes a first portion in which an auxiliary display unit which is always exposed to the outside is provided on the upper surface thereof and a second portion which is recessed from the first portion by a certain depth. The folder includes a main display unit which is connected to the body by a hinge to open/close the second portion, and which is folded onto the second portion to be disposed substantially parallel to the first portion.

In accordance with another exemplary embodiment of the present invention, there is provided an ultra-slim portable terminal which comprises a body, a folder opened from and closed to the body by means of a hinge, a first display unit disposed on the inner surface of the folder, and a second display unit disposed substantially parallel to the first display unit.

In accordance with still another object of an exemplary embodiment of the present invention, there is provided an ultra-slim portable terminal having a body, a folder, and a hinge for opening and closing the folder with respect to the body. A first display unit is disposed on the inner surface of the folder, and a second display unit is disposed on the outer surface of the folder so that it is substantially parallel to the first display unit.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF THE PREFERRED EXEMPLARY EMBODIMENT

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
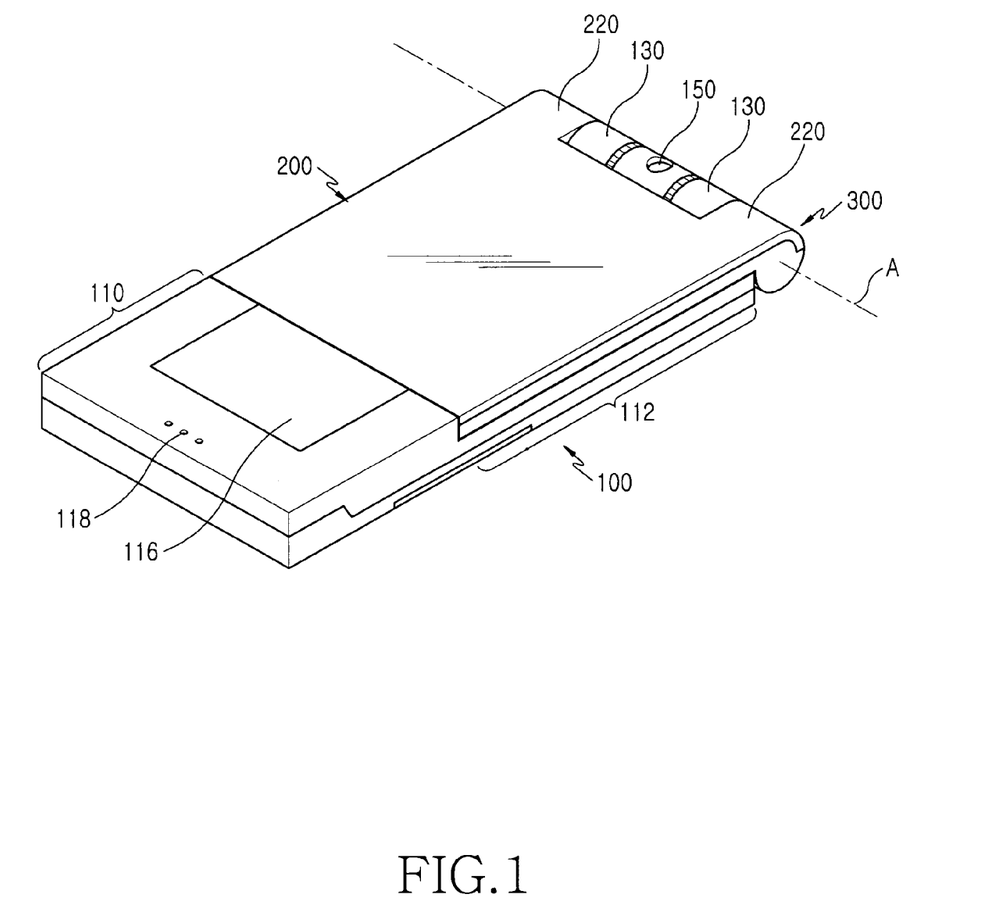
FIG. 1 is a perspective view of a portable terminal according to a first exemplary embodiment of the present invention.
Figure 2:
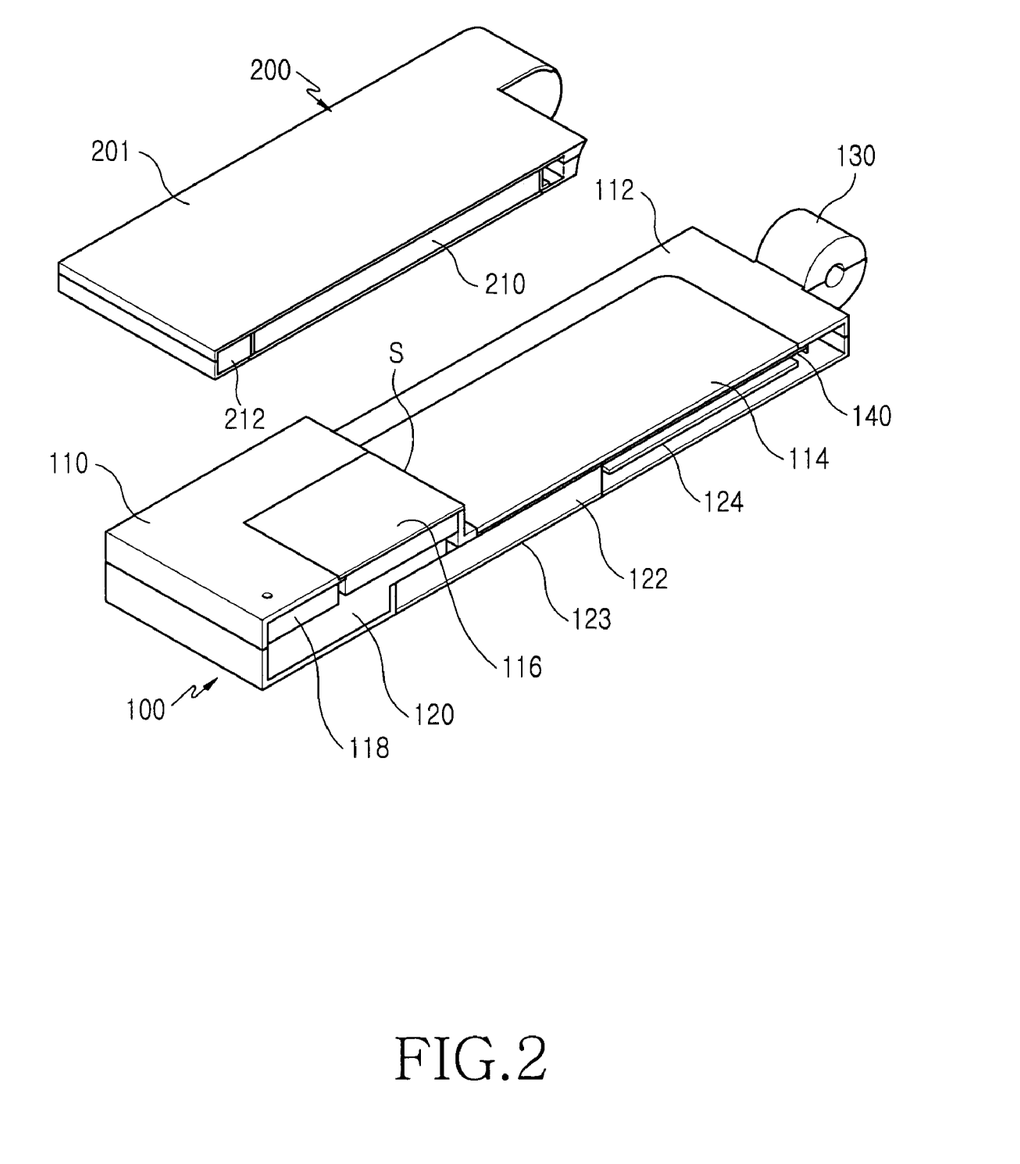
FIGS. 2 and 3 are cut-away perspective views of the interior structure of the portable terminal according to the first exemplary embodiment of the present invention.
Figure 3:
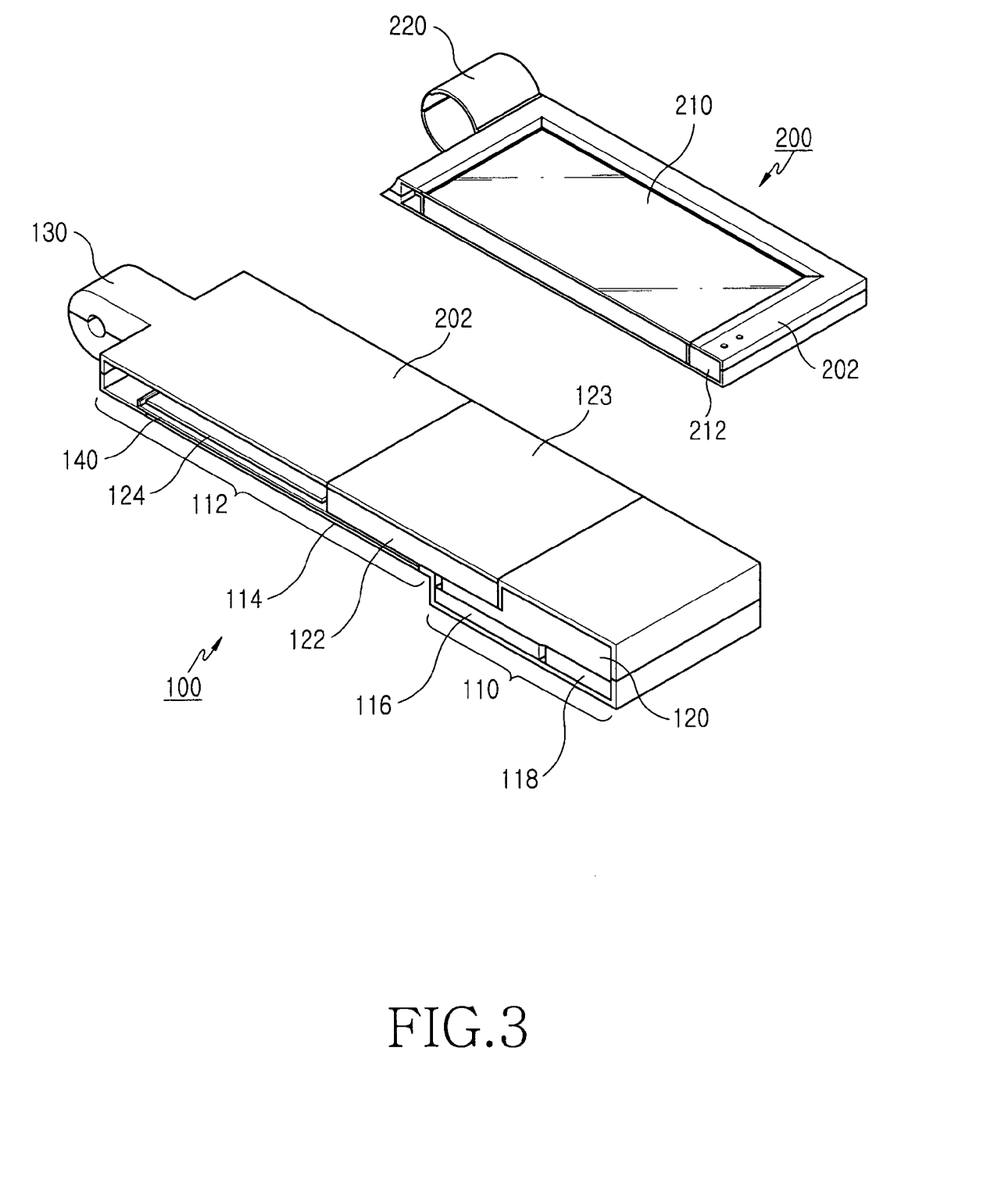

As shown in FIGS. 1 to 3, the portable terminal according to a first exemplary embodiment of the present invention is a folder-type type terminal. The portable terminal includes a body 100 and a folder 200 connected to the body 100 by a hinge 300 to be folded or unfolded. The hinge 300 includes a pair of inner side hinge arms 130 provided in the body 100 and a pair of outer side hinge arms 220 provided in the folder 200. The inner side hinge arms 130 and the outer side hinge arms 220 are engaged with each other by a hinge module (not shown). A rotation-type camera lens module 150 is provided between the inner side hinge arms 130. The rotation-type camera lens module 150 is coaxially aligned with the hinge axis A provided in the hinge 300.

The body 100 includes a first portion 110 protruding and a second portion 112 recessed from the first portion 110 by a certain depth. A stepped portion S is provided between the first and second portions 110 and 112. The first portion 110 is an area which is exposed to the outside regardless of the opening/closing operation of the folder 200. The second portion 112 has an upper surface opened/closed by the rotation of the folder 200. The folder 200 is folded to the second portion 112 so as to be stacked on the second portion 112, and is disposed substantially parallel to the first portion 110.

As shown in FIGS. 2 and 3, the first portion 110 includes an auxiliary display unit 116, a transmitter 118, and an integrated receiver/antenna apparatus 120. The auxiliary display unit 116 is mounted to the upper surface of the first portion 110 so that it can be always exposed to the outside. The auxiliary display unit 116 is mounted at a position adjacent to the transmitter 118 so that the two are substantially parallel to each other. The antenna apparatus 120 is disposed on the lower side of the auxiliary display unit 116 and the transmitter 118. An information input/output device 114 and a main board 124 are disposed in the second portion 112. The information input/output device 114 is disposed on the main board 124 so as to be stacked on the main board 124. Further, a space is provided for accommodating an inner battery cell 122 which is disposed so as to be stacked with the auxiliary display unit 116 and the information input/output device 114. Therefore, the antenna apparatus 120 and the inner battery cell 122 are disposed adjacent to each other and substantially parallel to each other, and the battery cell 122 and the main board 124 are disposed adjacent to each other and substantially parallel to each other. Reference numeral 123 refers to a battery cell cover.

Further, a shielding apparatus 140 is interposed between the information input/output device 114 and the inner battery cell 122 and the main board 124. The shielding apparatus 140 includes a shield can. The shield can 140 is disposed substantially parallel to the information input/output device 114. The shielding apparatus 140 can be disposed in the second portion 112, and can extend to the second area and the inner battery cell 122. The shielding apparatus 140 shields electromagnetic waves generated in the main board 124, and is spatially separated from the information input/output device 114. The shielding apparatus 140 functions as a bottom for the case in which the battery cell 122 is positioned, and supports the battery cell 122.

The folder 200 includes the main display unit 210 and the receiver 212. The receiver 212 and the main display unit 210 are adjacent to each other and are substantially parallel to each other. The main display unit 210 includes a liquid crystal display device.

If the folder 200 is folded onto the body 100, the main display unit 210 and the auxiliary display unit 116 are adjacent to each other and are substantially parallel to each other. The main display unit 210 faces the information input/output device 114.

As a result, according to the first exemplary embodiment of the present invention, the body 100 is given a slim shape by dividing the body 100 into stepped first and second portions 110 and 112, disposing the auxiliary display unit 116 (which is always exposed to the outside) and the transmitter 118 in the first portion 110, substantially parallel to each other, disposing the antenna apparatus 120 on the lower side of the auxiliary display unit 116 and the transmitter 118 so as to be stacked, and disposing the main board 124 and the battery cell 122 in the second portion 112 on the lower side of the information input/output device 114. In addition, since the main display unit 210 and the receiver 212 are disposed in the folder 200 substantially parallel to each other, the folder 200 is slim. Further, since the main display device 210 is folded and unfolded only in the second portion 112 and the auxiliary display unit 116 and the main display unit 210 are disposed substantially parallel to each other in the case in which the folder 200 is folded, the overall size of portable terminal is slim. The information input/output device 114 may also include a thin touch pad or a touch screen, thereby contributing to the slimness of the body.

Figure 4:
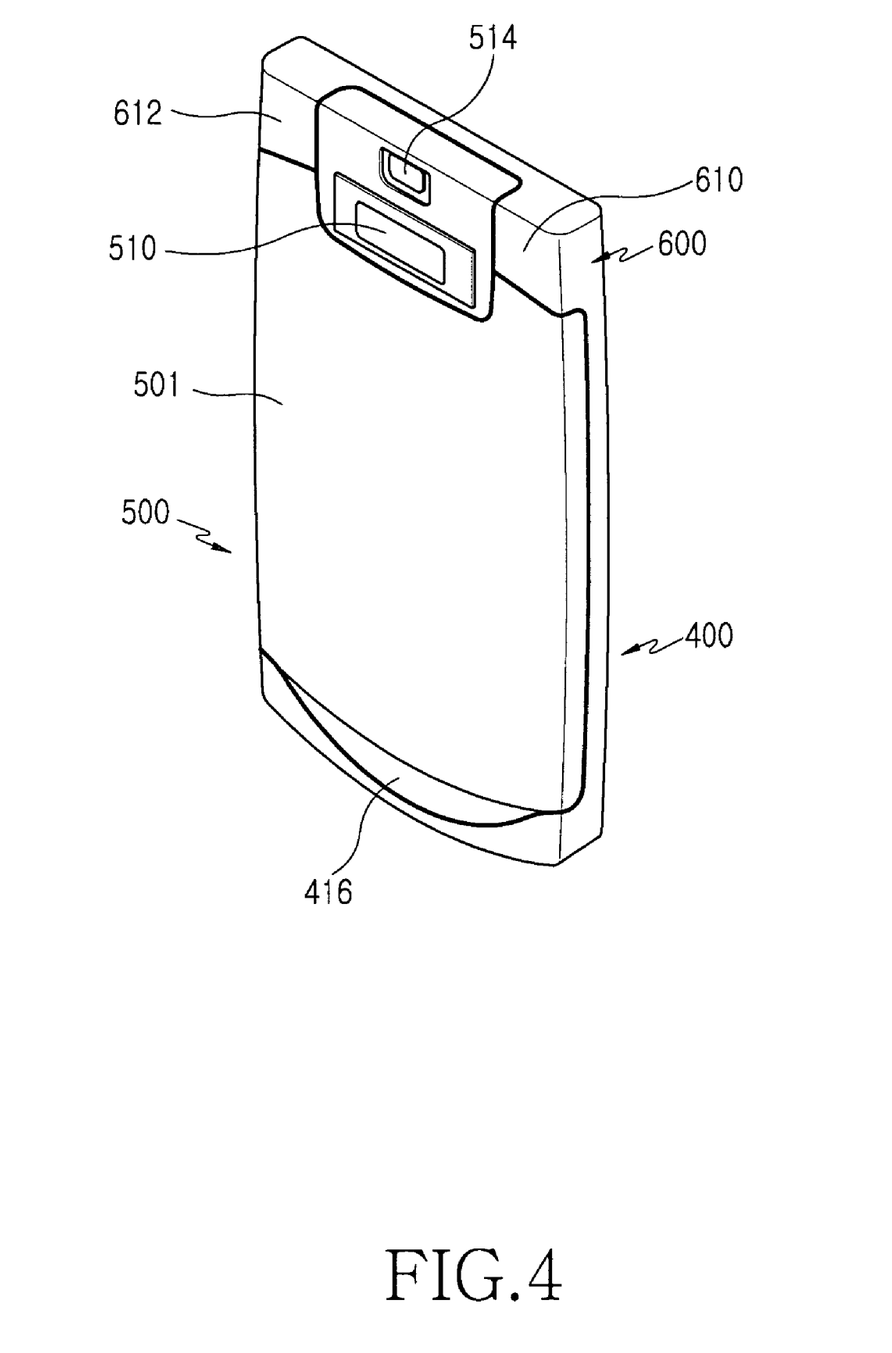
FIG. 4 is a perspective view showing a portable terminal according to a second exemplary embodiment of the present invention.
Figure 5:
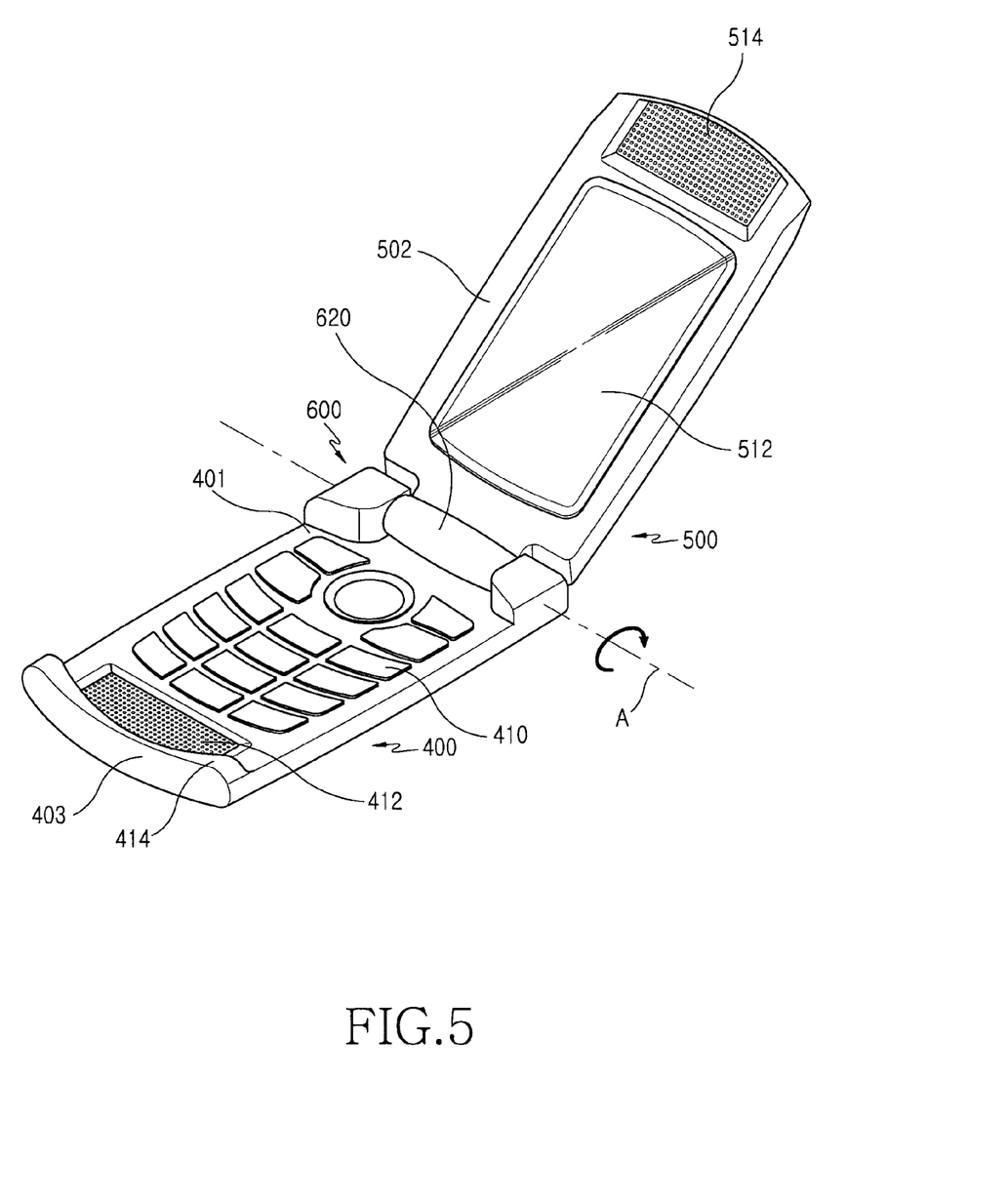
FIG. 5 is a perspective view of the portable terminal according to the second exemplary embodiment of the present invention, in which the folder is open.
Figure 6:
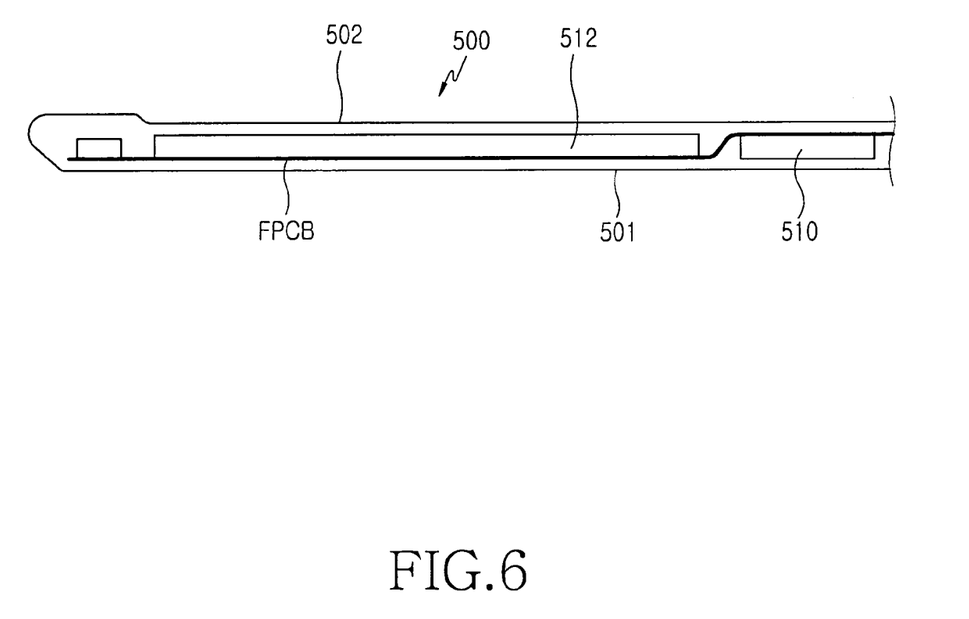
FIG. 6 is a sectional view of the portable terminal according to the second exemplary embodiment of the present invention which shows the arrangement of first and second display units.

The structure of the portable terminal according to a second exemplary embodiment of the present invention will now be described with reference to FIGS. 4 to 6. As shown in FIGS. 4 to 6, the portable terminal according to the second exemplary embodiment of the present invention includes a body 400, a folder 500, a hinge 600 for opening and closing the folder 500 with respect to the body 400, and first and second display units 512 and 510 mounted on the folder 600. Specifically, the folder 500 is rotatably connected to the body 400 by means of the hinge 600 so as to open and close an upper surface 401 of the body 400. The first display unit 512 is disposed on an inner surface of the folder 500, while the second display unit 510 is disposed on an outer surface thereof. The first and second display units 512 and 510 may be disposed substantially parallel to each other.

Since two display units are stacked on a folder in a conventional portable terminal, a conventional folder is thick. In the present invention, however, although two display units 512 and 510 are disposed on the portable terminal, the folder 500 is slim because the two display units 512 and 510 are disposed substantially parallel to each other.

A keypad 410 on which a plurality of keys are arranged is disposed on the upper surface 401 of the body 400 so that desired data can be input by pushing the keys. Alternatively, the keypad disposed on the upper surface 401 of the body may be replaced with a touch pad through which the desired data can be input by a touch operation as well as a pushing operation, or a touch screen which is used as an information input/output device. A touch pad or touch screen disposed on the upper surface 401 of the body as a data input/output device allows the body 400 to be made slim.

The hinge 600 includes a pair of side hinge arms 610 and 612 formed on the body 400, a center hinge arm 620 formed on the folder 500, and a hinge module (not shown). The center hinge arm 620 is disposed between the pair of side hinge arms 610 and 612 and engages the side hinge arms 610 and 612 by means of the hinge module, so as to provide a hinge axis A of the folder 500. Of course, the hinge 600 allows the folder 500 to be open and closed automatically, manually, or semi-automatically. The pair of side hinge arms 610 and 612 may be integrated with the body 400, specifically, a rear end of the body 400, while the center hinge arm 620 may be integrated with the folder 500.

The first display unit 512 is a main display unit having a broad width and is disposed on the inner surface of the folder 500 so as to be exposed and display various input data. The second display unit 510 is disposed on the outer surface 501 of the folder 500 so as to be exposed to the outside, and displays data which is frequently consulted, for example time information, date information, data regarding antenna reception intensity, data indicating the remaining lifespan of a battery, data indicating that a message is received, and the like. The second display unit 510 may have a smaller size than that of the first display unit 512.

As shown in FIG. 6, the first and second display units 512 and 510 are connected to one flexible printed circuit board (FPCB) so that circuit connection is simple, and contributes to the slimness of the folder. The flexible printed circuit board has one end connected to a bottom surface of the first display unit 512, and the other end to a bottom surface of the second display unit 510. The first display unit 512 displays the data when a user faces the inner surface 502 of the folder, while the second display unit 510 displays the data when a user faces the outer surface 501 of the folder.

The second display unit 510 is disposed adjacent to the hinge 600. Specifically, the second display unit 510 is mounted substantially parallel to the hinge 600 so that it faces the hinge 600. An illuminating device 514 is mounted substantially parallel to the second display unit 510 on the folder. The illuminating device 514 is provided to the center hinge arm 620. The illuminating device 514 is disposed between the pair of side hinge arms 610 and 612 and rotates along with the folder 500, depending on the rotation of the folder 500.

The portable terminal according to the present invention further includes means for maintaining the folder 500 stable when the folder 500 is closed with respect to the body 400 (the status shown in FIG. 1). The means includes a first protrusion 514 which is formed adjacent to the first display unit 512 on the inner surface 502 of the folder 500, has a desired shape, and protrudes substantially perpendicularly to the inner surface 502, and a recess 412 formed at a certain position on the upper surface 401 of the body, for receiving the first protrusion 514. When the first protrusion 514 is received in and engaged with the recess 412, the folder 500 can be stably maintained in the body 400 by the engagement force of the first protrusion 514 and the recess 412. A speaker unit may be mounted on the first protrusion 514, and a microphone unit may be disposed in the recess 412.

In addition, the means may further include a second protrusion 414 which protrudes from a leading end 403 of the body so as to be substantially perpendicular to the upper surface 401 of the body, and thereby secondarily support the closed folder 500. The second protrusion 414 may extend continuously along the leading end 403 of the body.

The first protrusion 514 on which the speaker unit is mounted is disposed adjacent to the first display unit 512, while the recess 414 is formed adjacent to the keypad 410 disposed on the upper surface of the body. In the state shown in FIG. 4, the recess 414 receives the first protrusion 514 so as to support the closing of the folder 500 using the engagement force with the first protrusion 514. Maintaining the folder 500 stable while it is closed provides structural stability to the hinge 600, and helps prevent a user from dropping the portable terminal. The second protrusion 414 also resists impact if the portable terminal is dropped, thereby protecting the body 400.

An elastic member 416, which may be made of, for example, rubber or silicone, functions as a damper to mitigate impact forces. A battery pack (not shown) is mounted on the bottom surface of the body.

According to the exemplary embodiments of the present invention, a plurality of display units, a transmitter, a receiver, an antenna apparatus, a battery cell, a main board, and the like are arranged at appropriate position to make the body and the folder slim, resulting in a portable terminal which is slim overall. Therefore, the portable terminal is convenient to carry, and the portable terminal is aesthetically pleasing. Furthermore, a shield may be provided in the portable terminal to safely support the battery cell on the bottom. Also, since two display units are disposed substantially parallel to each other, the structure of the portable terminal is advantageous for making the folder and the portable terminal slim. In particular, the folder is supported while it is closed, thereby improving the structural rigidity of the slim portable terminal so as to resist impact forces due to dropping of the portable terminal.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A portable terminal comprising:
    a body comprising a first portion and a second portion, the first portion comprising an auxiliary display unit disposed on an upper surface of the first portion, the second portion being recessed from the first portion; and
    a folder comprising a main display unit and a receiver, the folder being connected to the body by a hinge to open and close the second portion, the folder being substantially coplanar with the first portion, and the auxiliary display unit being disposed adjacent to the receiver when closing the second portion.

2. A portable terminal according to claim 1, wherein the first portion further comprises:
    a transmitter disposed substantially parallel to the auxiliary display unit; and
    an integrated receiver/antenna apparatus stacked under the auxiliary display unit and the transmitter.

3. A portable terminal according to claim 1, further comprising an information input/output device disposed on an upper surface of the second portion, and a space for accommodating an inner battery cell is disposed so as to be stacked under at least one of the information input/output device and the auxiliary display unit.

4. A portable terminal according to claim 3, wherein the integrated receiver/antenna apparatus and the inner battery cell are adjacent to each other and are substantially parallel to each other.

5. A portable terminal according to claim 3, further comprising a main board disposed so as to be stacked with the information input/output device, the main board being substantially parallel to the inner battery cell.

6. A portable terminal according to claim 5, further comprising a shielding apparatus provided between the information input/output device, and the inner battery cell and the main board, the shielding apparatus being substantially parallel to the information input/output device.

7. A portable terminal according to claim 6, wherein the shielding apparatus comprises a shield can.

8. A portable terminal according to claim 1, wherein the main display unit and the auxiliary display unit are substantially parallel to each other when the folder is closing the second portion.

9. A portable terminal, comprising:
    a body;
    a folder which is openable and closable with respect to the body by a hinge;
    a first display unit disposed on an inner surface of the folder; and
    a second display unit disposed on an outer surface of the folder and substantially parallel to the first display unit;
    wherein the second display unit is disposed in a longitudinally extended direction of the first display unit.

10. A portable terminal according to claim 9, wherein the first display unit is larger than the second display unit.

11. A portable terminal according to claim 9, wherein the first and second display units are disposed on a flexible printed circuit board.

12. A portable terminal according to claim 9, wherein the second display unit is disposed adjacent to the hinge.

13. A portable terminal according to claim 9, wherein a protruding speaker unit is disposed adjacent to the first display unit, and a groove is disposed at an inner surface of the body so as to correspond to the speaker unit.

14. A portable terminal according to claim 9, wherein a leading end of the body protrudes upward to support the folder when closing the folder over the body.

15. A portable terminal according to claim 9, wherein the hinge comprises:
   a pair of side hinge arms formed on the body; and
   a center hinge arm formed on the folder, the center hinge arm engaging the side hinge arms.

16. A portable terminal according to claim 15, wherein the center hinge arm comprises an illuminating device disposed between the pair of side hinge arms.

17. A portable terminal having a body, a folder, and a hinge for opening and closing the folder with respect to the body, the portable terminal comprising:
   a first display unit disposed on an inner surface of the folder; and
   a second display unit disposed on an outer surface of the folder so as to be substantially parallel to the first display unit;
   wherein the second display unit is disposed in a longitudinally extended direction of the first display unit.

18. A portable terminal according to claim 17, further comprising means for supporting the folder stably when the folder is closed with respect to the body.

19. A portable terminal according to claim 18, wherein the means for supporting the folder comprises:
   a first protrusion which protrudes substantially perpendicularly from the inner surface of the folder; and
   a recess formed on the body for receiving the first protrusion.

20. A portable terminal according to claim 19, wherein the recess for receiving the first protrusion is formed on an upper surface of the body.

21. A portable terminal according to claim 20, wherein a speaker unit is disposed in the first protrusion.

22. A portable terminal according to claim 20, wherein the means for supporting the folder further comprises a second protrusion protruding from a leading end of the body, the second protrusion being substantially perpendicular to the upper surface of the body so as to maintain the folder in a closed state.

23. A portable terminal according to claim 22, wherein the second protrusion extends substantially continuously along the leading end of the body.

* * * * *